United States Patent
Hansen

[11] Patent Number: 5,155,773
[45] Date of Patent: Oct. 13, 1992

[54] ELECTRODYNAMIC TRANSDUCER INCLUDING INSET

[75] Inventor: Kaj B. Hansen, Horsens, Denmark

[73] Assignee: Kirk Acoustics A/S, Horsens, Denmark

[21] Appl. No.: 594,734

[22] Filed: Oct. 9, 1990

[30] Foreign Application Priority Data

Oct. 9, 1989 [DK] Denmark .................. 4983/89

[51] Int. Cl.⁵ .................. H04R 25/00; H04M 1/00
[52] U.S. Cl. .................. 381/194; 381/188;
381/192; 381/199; 381/200; 379/428; 379/433;
379/436; 379/437
[58] Field of Search .................. 381/86, 150, 168, 169,
381/173, 188, 191, 194, 200, 199, 192; 379/433,
437, 419, 428, 436

[56] References Cited

U.S. PATENT DOCUMENTS

| | | | |
|---|---|---|---|
| 2,404,877 | 7/1946 | Horlacher | 381/150 |
| 2,423,014 | 6/1947 | Gilman | 381/150 |
| 3,539,735 | 11/1970 | Marchard | 381/150 |
| 4,399,334 | 8/1983 | Kakiuchi et al. | 381/194 |
| 4,418,247 | 11/1983 | Hansen | 381/194 |
| 4,451,928 | 5/1984 | Murayama | 381/86 |
| 4,529,846 | 7/1985 | Freeman et al. | 381/194 |
| 4,796,288 | 1/1989 | Busche et al. | 379/433 |
| 4,843,628 | 6/1989 | Hofer | 381/200 |
| 4,984,268 | 1/1991 | Brown et al. | 379/433 |
| 5,018,206 | 5/1991 | Suzuki | 381/188 |
| 5,058,154 | 10/1991 | Andersen | 379/433 |

FOREIGN PATENT DOCUMENTS

| | | | |
|---|---|---|---|
| 0081780 | 6/1983 | European Pat. Off. | 381/194 |
| 2854560 | 6/1980 | Fed. Rep. of Germany | 381/194 |
| 3634619 | 4/1988 | Fed. Rep. of Germany | 379/437 |
| 3634620 | 4/1988 | Fed. Rep. of Germany | 379/437 |
| 3634658 | 4/1988 | Fed. Rep. of Germany | 379/437 |
| 0073195 | 6/1980 | Japan | 381/168 |
| 0004400 | 1/1984 | Japan | 381/188 |
| 983997 | 2/1965 | United Kingdom | 381/194 |

OTHER PUBLICATIONS

Tremawe, "Audio Cyclopedia", 1969, p. 153.

Primary Examiner—James L. Dwyer
Assistant Examiner—W. Cumming
Attorney, Agent, or Firm—Spencer, Frank & Schneider

[57] ABSTRACT

An electromagnetic transducer has a moving coil, a diaphragm and a magnet system enclosed within protecting covers. It includes an inset placed between the magnet system and the front cover. The inset is made of a non-magnetic, electrically insulating material and is provided with an aperture.

12 Claims, 1 Drawing Sheet

ELECTRODYNAMIC TRANSDUCER INCLUDING INSET

BACKGROUND OF THE INVENTION

1. Field of the Invention

The present invention relates to electromagnetic transducers of the moving coil type.

2. Background Information

Such transducers are used in telephone subsets and their important features should be:
good acoustic sensitivity
very low sensitivity to external magnetic fields
high insulation from electrical fields between the front cover and the terminals, and
low price.

The main problem with known transducers and microphones of the moving coil type is that they are too sensitive to external magnetic ac fields.

A transducer of this type and which is described in U.S. Pat. No. 4,418,247 (K. B. Hansen 8) has an acoustic SFERT weighed sensitivity of $S = -53$ dB relatively to 1V/PA. This transducer has an immunity to external ac fields which is better than the average moving coil transducers on the market.

The sensitivity to external magnetic fields on the order of $10^{-7}$ T and in the frequency range 50 Hz to 4 kHz is as follows:

$$P < S - 35 \text{ dB} = -53 - 35 \text{ dB} = -88 \text{dB}.$$

The main object of the present invention is to improve this attenuation picture.

A further problem with known telephone handsets is that the microphones built into the set are too sensitive towards static electricity. Due to the lack of space in the microphone end of the handset and due to the desired acoustical sensitivity, the distance from the outer side of the microphone end of the handset to the front of the handset is usually very small. In some countries telephone subsets shall withstand a test voltage of 15 kV between the outside of the microphone end of the handset and the terminals of the subset. This means that the transducer taken alone should show an insulation voltage of some 12 kV from its front to its terminals.

SUMMARY OF THE INVENTION

The invention is in its basic form designed with an acoustic sensitivity equal to the S value mentioned above, but its sensitivity to external magnetic fields is $P = -108$ dB, which is a reduction of 20 dB relative to the known transducer.

Further features relative to the known transducers are that the invention:
improves magnetic shielding
represents the acoustic inlet impedance
protects the sensitive diaphragm mechanically
holds the magnet system assembled, and
increases the electric flash-over or insulation voltage from the front cover to the terminals.

BRIEF DESCRIPTION OF THE DRAWINGS

The above mentioned features and objects of the present invention and others will be made clear from the following detailed description of embodiments of the invention taken in conjunction with the drawings, where.

DETAILED DESCRIPTION OF THE PREFERRED EMBODIMENT(S)

Figure 1:
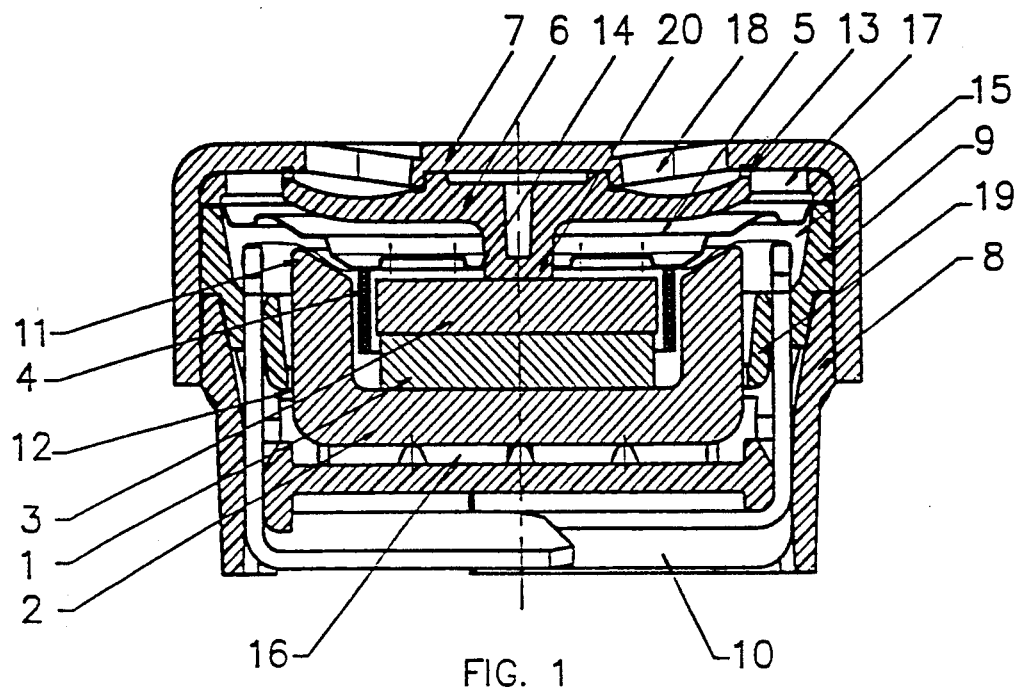
FIG. 1 is a cross-section of the transducer.

In FIG. 1 there is illustrated an electrodynamic transducer comprising a magnet system 1, 2 and 3, a moving coil 4 and a diaphragm 5 enclosed within protecting covers, a front cover 7 and a back cover 8. The magnet system consists of a magnet 1, an outer pole shoe 2 and an inner pole shoe 3. An inset device 6 is placed between the magnet system and the front cover 7 to give the transducer its improved features. The diaphragm 5 is provided with a supporting ring 9 which also supports two terminals 10.

The outer pole shoe 2 is given simple geometry and small dimensions to make it inexpensive. To obtain improved magnetic shielding of the coil, the outer edge 11 of the outer pole shoe 2 is extended upwards as far as is allowed by the design of the inset 6 and the diaphragm 5. This can be made possible by forming the intermediate part of the inset (6) somewhat funnel shaped in the direction of the front cover 7 to allow a correspondingly shaped intermediate part of the diaphragm 5 and a correspondingly shaped outer part or edge 11 of the outer magnet pole shoe 2. The edge of the pole shoe can also have other forms to ensure that the coil is shielded by the iron body.

The inset 6 as shown, fixes the axial position of the magnet assembly relative to the front cover 7 and diaphragm 5, as the front cover 7 is forcing the back cover 8 against the lower side of the outer pole shoe 2. This is one of the features of the inset 6. Quite often outer pole shoes are provided with studs, protrusions or the like to maintain the magnet system assembled in the correct position within the transducer. Such studs and protrusions are, as will be understood, no longer necessary, and the diameter of the front cover can be held as small as possible, thereby maximizing the shielding effect.

To obtain protection against external magnetic fields, the front cover 7 is made of metal, such as iron. The front cover will thereby attenuate the external magnetic fields by counter magnetomotoric forces caused by the electrical conducting properties of the iron and by magnetic shunts bypassing the moving coil 4 caused by the magnetic properties of the iron.

Figure 2:
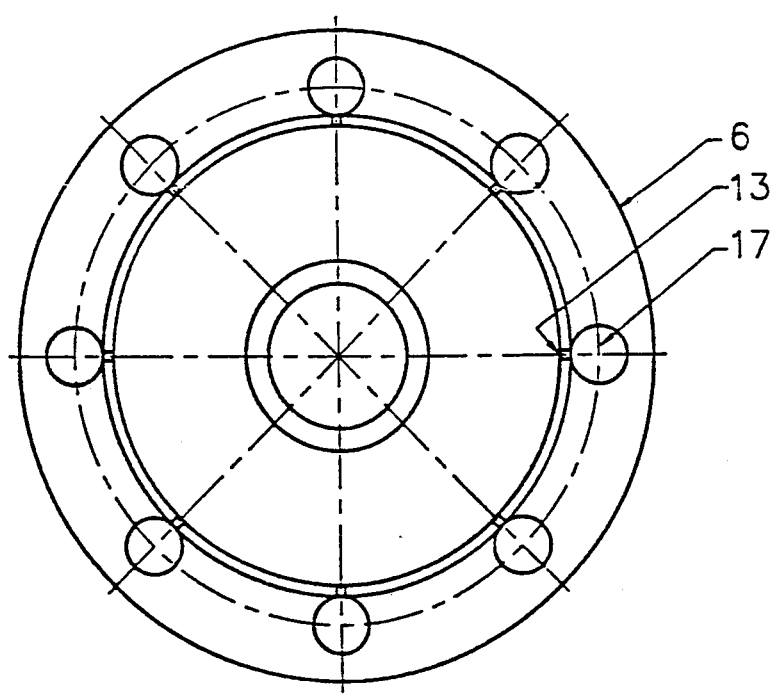
FIG. 2 is the insert seen from above.

To obtain sufficient attenuation, the material of the front cover must be rather thick, in the order of 0.5–1.0 mm thick, and it will therefore no longer be possible to obtain a desired acoustic inlet impedance by making slots in the front cover. Desired slots are obtained, however, by making grooves 13 in the upper surface of the inset 6 and closing the grooves by the inner surface of the front cover 7. The slots or apertures 13 should preferably have a crossection corresponding to circular holes having a diameter of 0.1–0.3 mm and a length of 0.1–0.4 mm. A second feature of the inset 6 is therefore that the front cover 7 itself need not be provided with the desired slots, but can instead be provided with simple large slots or holes 18. The number and orientation of slots 18 can, but need not, correspond to the number of slots 13 and to the number of apertures 17 in the inset 6, this number preferably being 3–8. Refer now to FIG. 2.

The inset 6 is provided with a number of apertures 17 which are displaced relatively to slots or holes 18 in the front cover 7. This is a third feature of the inset 6. When the front cover is provided with ordinary large slots 18 there would exist a risk of damaging the sensitive diaphragm with sharp items like pencil points, hair pins etc., unless the holes of the inset 6 are displaced from the holes in the front cover. The apertures 17 in the inset 6 and the slots or holes 18 in the front cover 7 are interconnected with the slots 13 to provide a labyrinth for sound waves.

A fourth feature of the inset 6 is that it prevents the magnet system 1, 2, 3 from disassembling if the handset is subjected to heavy accelerations, without gluing or cementing the pole shoes 2 and 3 to the magnet 1. Other prior art transducers make use of riveting or molding, but these methods require a hole in the magnet, thereby making it larger and more expensive, whereby other parts of the transducer must be larger and more expensive also.

It is a general requirement that transducers for telephones should not be sensitive to frequencies lower than 300 Hz. It is commonly known, from for instance European Patent No. 81780 (K. B. Hansen 9), to reduce acoustic sensitivity by making an aperture such as a hole or a slot in the diaphragm. Such an aperture does, however, have the drawback that the distance from the front of the front cover through the aperture to the iron parts and thereby to the terminals is short, resulting in a low flash-over voltage. The inset 6 is provided with an axially arranged cylindrical part 20 which is extended through an axially arranged aperture 14 in the diaphragm 5 into contact with the inner pole shoe 3. A fifth feature of the inset 6 is therefore that the distance for electrical flash-overs between the front cover and the iron parts is increased. Electrical flash-overs would now have to take place from the front cover 7 through the holes 17 in the inset 6, along the diaphragm and through the diaphragm aperture 14 to the iron parts. The cylindrical gap between the axial part 20 of the inset 6 and the diaphragm aperture 14 is in the order of 0.1–0.3 mm wide and 3.0–9.0 mm long.

When the dimensions of the transducer are limited (due to cost) and because the front cover 7, due to magnetic shielding should have its cylindrical part as close as possible to the moving coil 4, there is very limited space available to form an acoustic impedance between the volume 15 underneath the diaphragm and the back volume 16. This acoustic coupling is known from various transducer constructions, mostly in the form of a piece of fabric covering one or more holes, or as in U.S. Pat. No. 4,418,247 (K. B. Hansen 8) to have a number of circular pins inserted into a corresponding number of square holes. Neither of the mentioned solutions are ideal, and have been replaced by a unique solution in the present transducer. The inner part 19 of the diaphragm ring 9 is made resilient to fit well against the outer pole shoe 2 and it is provided with a number of small grooves 12 to constitute the desired acoustic impedance between the two volumes 15 and 16. Grooves 12 of the desired number and area can easily be obtained when molding the ring 9.

The inset 6 is made of a non-magnetic and electrically insulating material such as polyamide or ABS, and it is radially in mechanical contact with the inside of the front cover 7.

The terminal arrangement of this new transducer is also unique in that it allows use of standard terminals having dimensions of 0.5×2.8×7.0 mm and the use of standard push connections within the very small space limited and protected by the lower rim of the back cover 8. The terminals 10 which are secured in the diaphragm ring 9, extend through the back cover 8. When the terminals have been interconnected with the moving coil as indicated, and the front cover has engaged the back cover, the terminal ends are bent to be protected by the lower rim of the back cover.

The above described embodiments of this invention should be taken as being examples only and should not be considered as limiting the scope of protection.

I claim:

1. An electrodynamic transducer comprising:
   a moving coil;
   a diaphragm;
   a magnet system; said moving coil, diaphragm and magnet system being enclosed within front and back protecting covers; and
   a unitary inset disposed between said magnet system and the front protecting cover, said inset having at least one aperture and being radially in mechanical contact with the inside of said front cover, said inset being made of a non-magnetic and electrically insulating material;
   wherein said diaphragm is disposed between said inset and said magnet system and wherein said inset includes an axially arranged cylindrical portion which extends through an axially arranged aperture in said diaphragm and contacts said magnet system; and
   wherein there is a cylindrical gap between said axially arranged cylindrical part of said inset and said diaphragm aperture on the order of 0.1–0.3 mm wide and 3.0–9.0 mm long.

2. The transducer according to claim 1, wherein said front cover includes a plurality of slots or holes and said inset includes a corresponding plurality of apertures radially displaced from respective slots or holes in said front cover.

3. The transducer according to claim 2, wherein said slots or holes in said front cover are arranged axially at a smaller diameter than said apertures in said inset.

4. The transducer according to claim 1, wherein said inset is made of a non-magnetic and electrically insulating material such a polyamide or ABS.

5. The transducer according to claim 1, wherein said front cover is made of metal such as iron and has a thickness in the order of 0.5 to 1.0 mm, pressure between said front cover and said magnet system caused by said inset fixing the axial position of the magnet system relative to the front cover when the transducer is assembled.

6. An electrodynamic transducer comprising:
   a moving coil;
   a diaphragm;
   a magnet system; said moving coil, diaphragm and magnet system being enclosed within front and back protecting covers; and
   a unitary inset disposed between said magnet system and the front protecting cover, said inset having at least one aperture and being radially in mechanical contact with the inside of said front cover, said inset being made of a non-magnetic and electrically insulating material;
   wherein said magnet system includes an outer magnet pole shoe, and wherein a middle part of said inset is funnel shaped in the direction of said front cover thereby fitting together with a correspondingly shaped middle part of said diaphragm and a correspondingly shaped outer part or edge of said outer magnet pole shoe.

7. The transducer according to claim 6, wherein said magnet system includes an inner magnet pole shoe and said inset is clamped axially between the inside of said front cover and said inner magnet pole shoe.

8. The transducer according to claim 6, wherein said front cover includes a plurality of slots or holes and said inset includes a corresponding plurality of apertures radially displaced from respective slots or holes in said front cover.

9. The transducer according to claim 8, wherein said apertures in said inset and the respective slots or holes in said front cover are interconnected by substantially radially arranged grooves to thereby form a labyrinth for sound waves.

10. The transducer according to claim 2, wherein said apertures in said inset and the respective slots or holes in said front cover are interconnected by substantially radially arranged grooves to thereby form a labyrinth for sound waves.

11. An electrodynamic transducer comprising:
a moving coil;
a diaphragm;
a magnet system; said moving coil, diaphragm and magnet system being enclosed within front and back protecting covers; and
a unitary inset disposed between said magnet system and the front protecting cover, said inset having at least one aperture and being radially in mechanical contact with the inside of said front cover, said inset being made of a non-magnetic and electrically insulating material;
wherein said front cover includes a plurality of slots or holes and said inset includes a corresponding plurality of apertures radially displaced from respective slots or holes in said front cover;
wherein said apertures in said inset and the respective slots or holes in said front cover are interconnected by substantially radially arranged grooves to thereby form a labyrinth for sound waves; and
wherein said grooves are formed in the upper surface of said inset, said grooves being closed by the inner surface of said front cover.

12. An electrodynamic transducer comprising:
a moving coil;
a diaphragm;
a magnet system; said moving coil, diaphragm and magnet system being enclosed within front and back protecting covers; and
a unitary inset disposed between said magnet system and the front protecting cover, said inset having at least one aperture and being radially in mechanical contact with the inside of said front cover, said inset being made of a non-magnetic and electrically insulating material;
wherein said front cover includes a plurality of slots or holes and said inset includes a corresponding plurality of apertures radially displaced from respective slots or holes in said front cover;
wherein said apertures in said inset and the respective slots or holes in said front cover are interconnected by substantially radially arranged grooves to thereby form a labyrinth for sound waves; and
wherein said grooves have a circular cross-section having a diameter of 0.1–0.3 mm and a length of 0.1–0.4 mm, the number of said grooves being from 3 to 8.

* * * * *